Sept. 14, 1965 T. N. MELIN 3,205,924
MECHANICAL OFF-BEAR AND SLAB-HANDLING APPARATUS
Filed Dec. 26, 1962 5 Sheets-Sheet 1
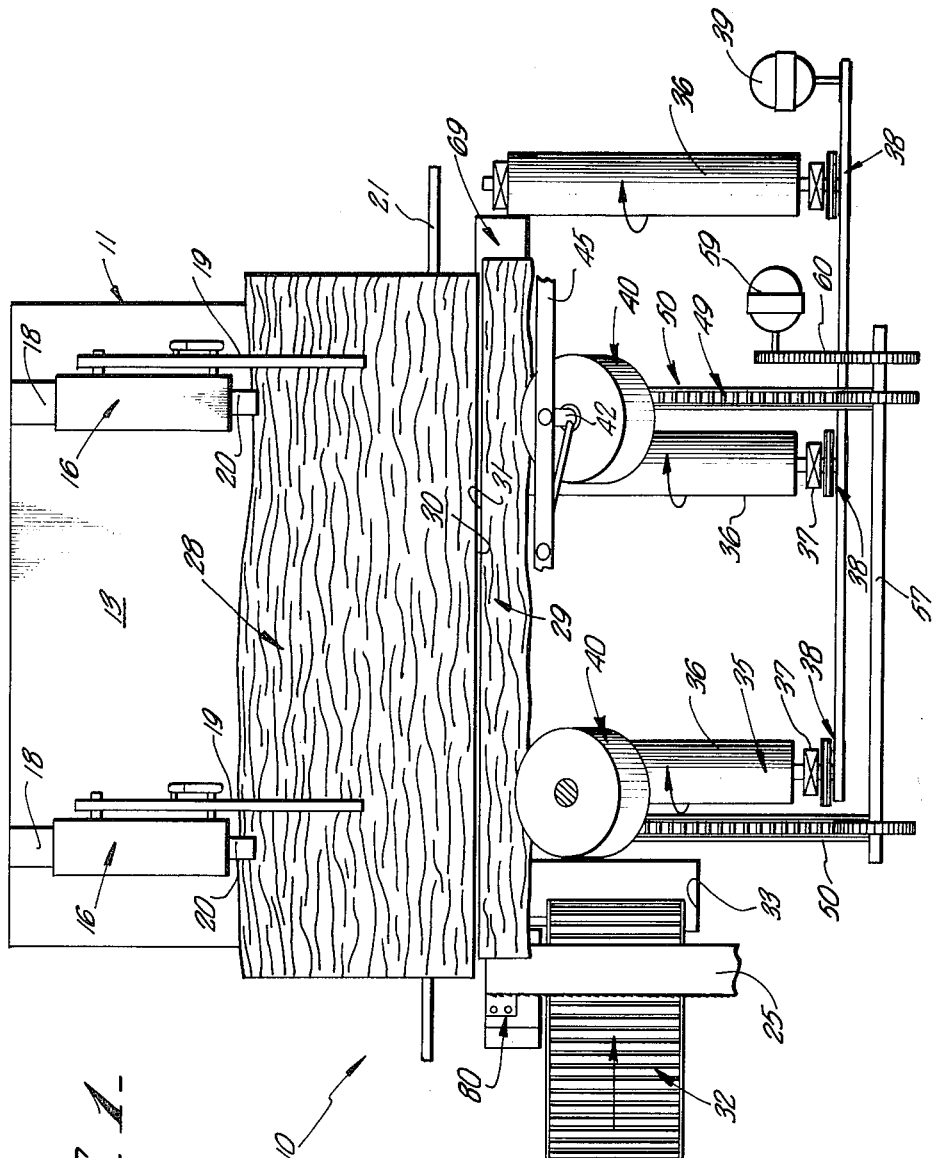
INVENTOR.
THOMAS N. MELIN
BY
Christie,Parker&Hale
ATTORNEYS.

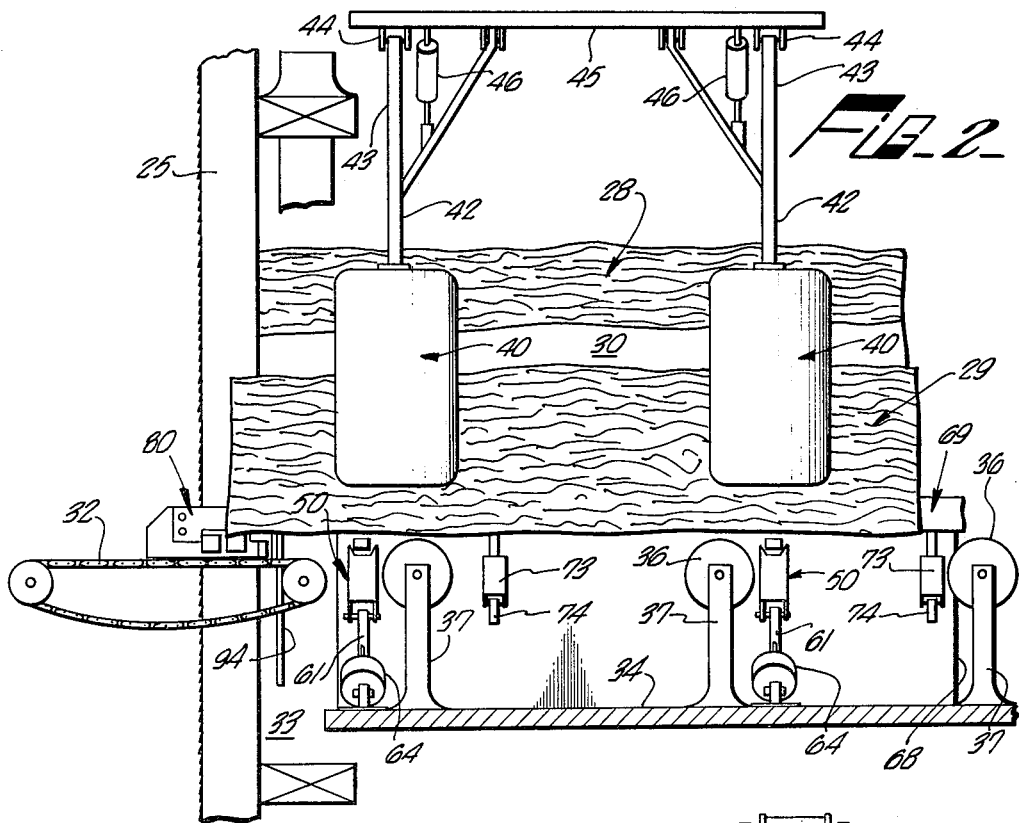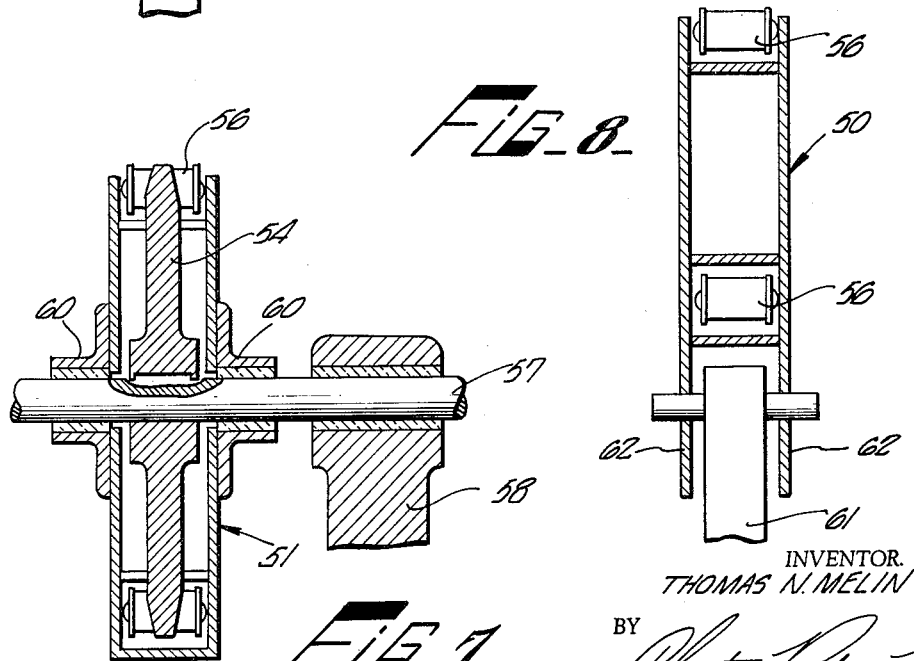

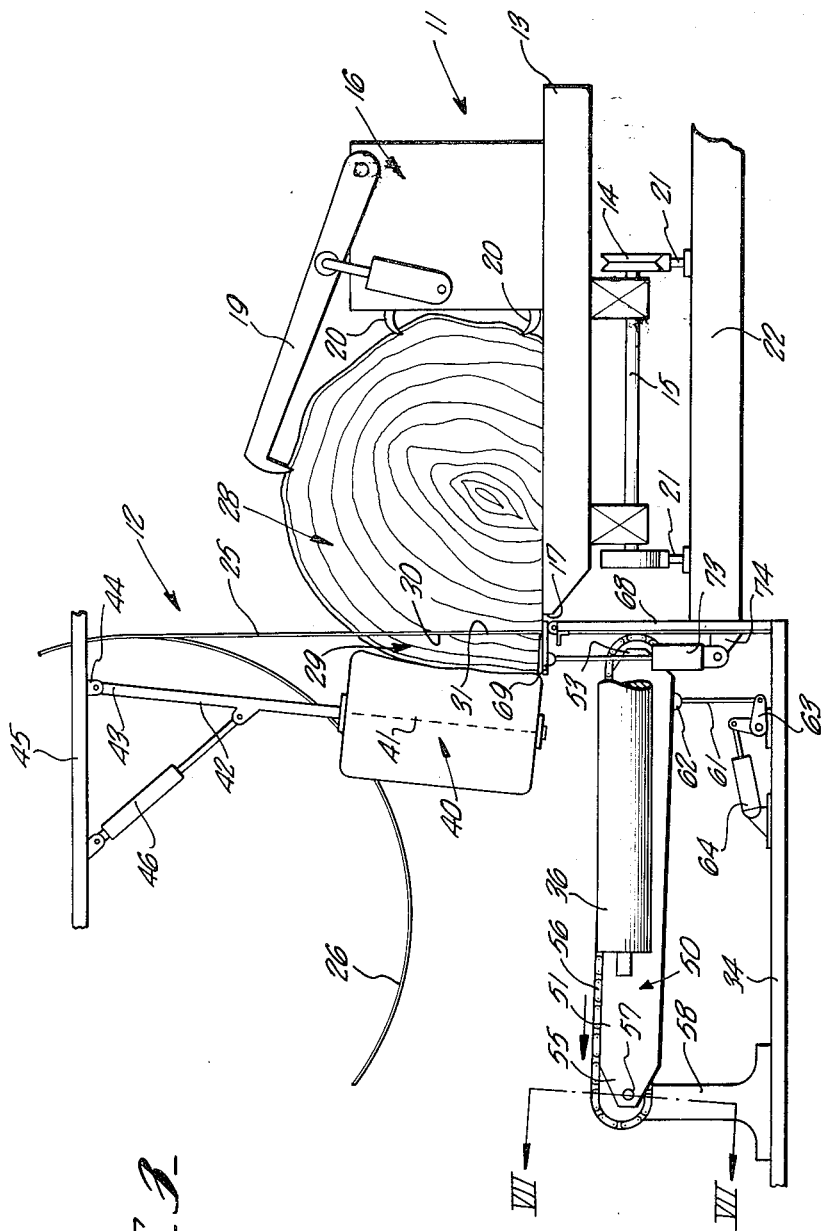

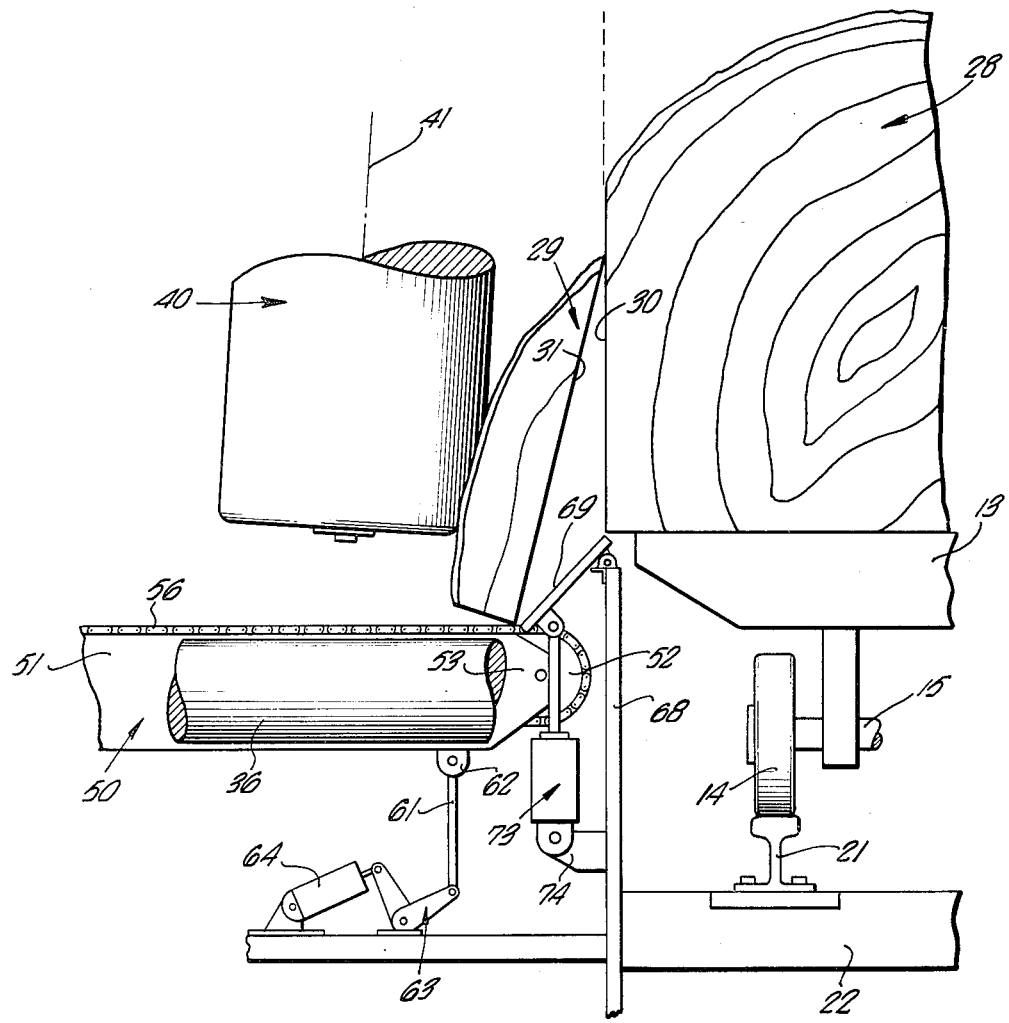

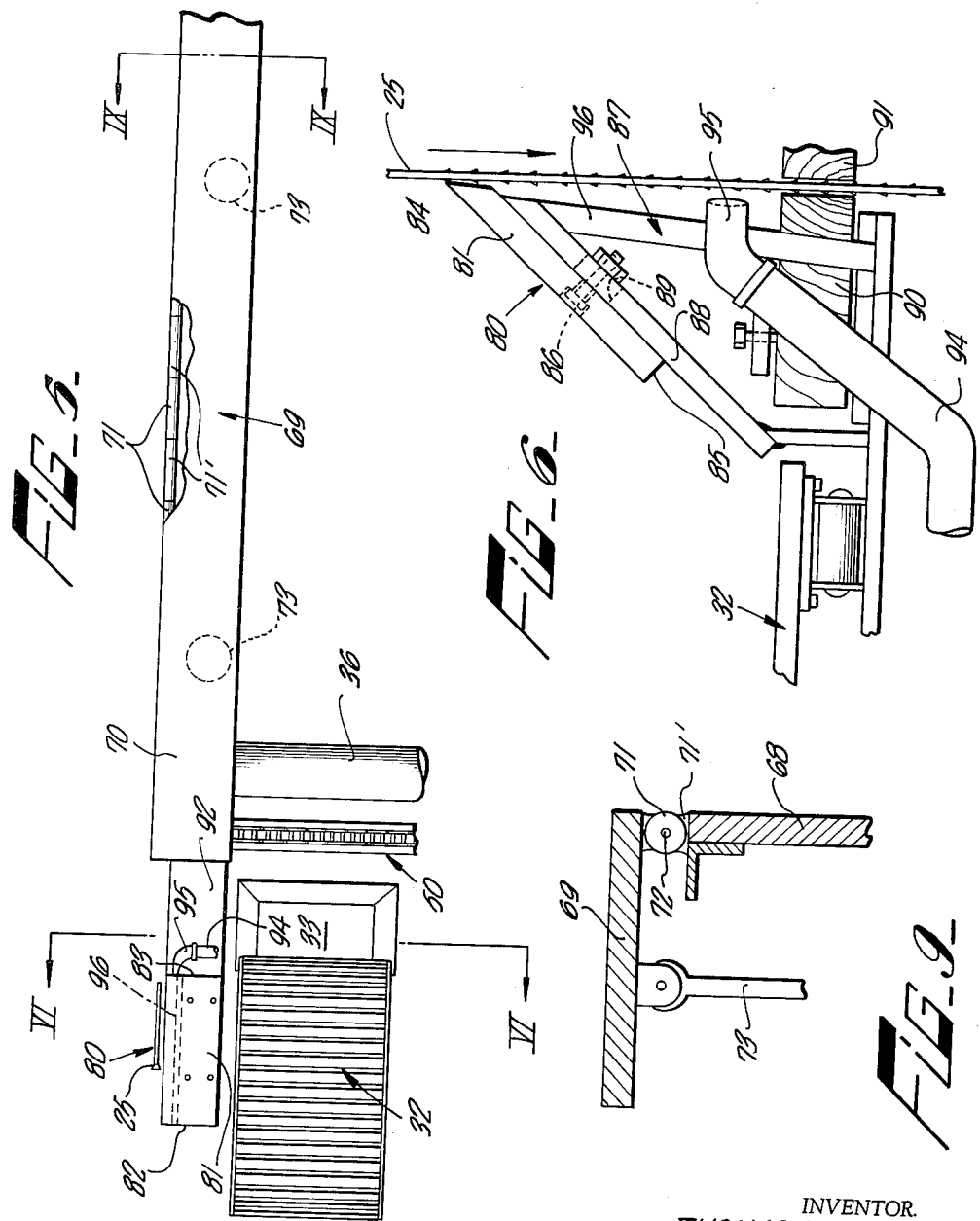

United States Patent Office 3,205,924
Patented Sept. 14, 1965

3,205,924
MECHANICAL OFF-BEAR AND SLAB-HANDLING APPARATUS
Thomas N. Melin, 1424 24th Ave., Longview, Wash.
Filed Dec. 26, 1962, Ser. No. 247,055
8 Claims. (Cl. 143—157)

This invention relates to mechanical off-bear and slab-handling devices for handling sawed slabs in sawmills. More particularly, the present invention relates to an apparatus for maintaining a slab in position relative to a log until the cut between the log and slab is complete to eliminate breakout, and for moving the cut slab from the log in a predetermined manner to slab conveying means.

In the sawmill and lumbering industry, sawmills may be generally classified as being either of the circular saw type wherein a log moves relative to the saw to sever a cant or slab from the log, or of the type in which a bandsaw is provided for movement relative to a log. In the usual case the log is mounted to a movable carriage, but in some instances the log is fixed with the saw moving relative to the log. The present invention is described in conjunction with a sawmill using a stationary bandsaw headrig wherein the log moves reciprocably past the headrig. This environment is merely exemplary since the present invention has utility in conjunction with sawmill apparatus in which a bandsaw or circular saw is movable past a fixed log.

As the slab is cut from the log, there is a tendency for the slab to fall from the log before the cut is complete. This phenomenon is known in the sawmill industry as "breakout." Breakout is caused by the cantilevered load of the slab on the log, the load increasing as the cut progresses to decrease the root between the slab and the log. When breakout occurs, the slab is torn from the log along a fracture surface which usually is not planar and which results in losses to the sawmill operator. Negative breakout on a slab often results in a pit in a finished timber sawed from the slab, while positive breakout, i.e. wood projecting from the slab, interferes with guides and positioning means with which the slab is engaged during further sawing and planing operations. In etiher case, non-uniform timbers result.

In handling the slab after severance from the log and during transfer of the slab from the log to a conveyor, it is desirable to position the slab on the conveyor with the sawed faced of the slab disposed downwardly, especially where the slab is partially round. A partially round slab is known as a "cant," but the terms "cant" and "slab" are used interchangeably herein. The normal tendency of a partially round cant is to drop from the log to a conveyor and to come to rest on the conveyor with its sawed face upwardly. Such a cant must be turned over before it can be subjected to further sawing or treatment. Persons who are employed to manually turn the logs on the conveyor are known in the industry as "off-bearers."

The present invention resides in an apparatus which mechanically off-bears the cant from the log so that the cant is disposed on a conveyor with its sawed face downwardly of the conveyor. The off-bear apparatus also maintains the cant in position relative to the log until the sawed cut is complete. This feature of the invention eliminates break-out. The apparatus is simple, rugged and efficient and may be added conveniently to existing sawmill facilities.

Generally speaking, the present invention provides an off-bear assembly for handling a slab during and after cutting of the slab from a log having a planar slab face. The off-bear assembly comprises slab engaging means disposed opposite the log slab face for frictionally engaging the slab during cutting of the slab from the log to maintain the slab substantially in position relative to the log. The slab engaging means exerts a primary vector component of force on the slab in a direction substantially normal to the plane of the log slab face. Slab conveying means are provided and are disposed below the log adjacent the log slab face. The invention further comprises slab guiding means disposed opposite the log slab face for guiding the slab from the log onto the slab conveying means in a preselected manner.

In a preferred embodiment of the invention, the off-bear assembly is provided in combination with a stationary bandsaw type headrig. The slab guiding means includes a stationary slab deflector plate adjacent the bandsaw opposite the active length of the bandsaw from the log. The deflector plate is inclined relative to the log slab face to deflect the lower edge of a slab falling from its initial position relative to the log after the slab is severed from the log to direct the slab to the conveyor with the sawed face of the slab disposed downwardly on the conveyor.

In another form of the invention, the log is mounted to a platform. The off-bear apparatus comprises slab conveying means disposed adjacent the platform below the log slab face. First slab guiding means are disposed adjacent the platform superadjacent the conveying means for guiding the slab into engagement with the conveying means. Means are provided for hingeably mounting the first guiding means adjacent the platform. The apparatus also includes means for moving the first guiding means relative to the conveying means.

The above-mentioned and other features of the invention are more fully set forth in the following detailed description of the invention which is made in conjunction with the accompanying drawings, wherein:

FIG. 1 is a top plan view of a sawmill according to the present invention illustrating a fixed headrig and a log in the position relative to the headrig in which a slab has been severed from the log;

FIG. 2 is an elevation view of the sawmill illustrated in FIG. 1 showing the log and headrig in the same relative position as illustrated in FIG. 1;

FIG. 3 is an end elevation view of a sawmill according to the present invention illustrating a slab in position relative to the log during sawing of the slab and shows the slab lateral conveying means disposed in its retracted position;

FIG. 4 is an end elevational view of the sawmill shown in FIG. 3 in the condition wherein the slab is transferred from adjacent the log to the lateral conveying means and shows the lateral conveying means in its elevated condition;

FIG. 5 is a top plan view of the fixed and movable slab deflecting and guiding means illustrated in FIGS. 3 and 4;

FIG. 6 is an enlarged cross-sectional view taken along line VI—VI of FIG. 5 illustrating the fixed slab deflector plate;

FIG. 7 is an enlarged cross-sectional elevation of a lateral slab conveying means through the outboard end thereof;

FIG. 8 is an enlarged cross-sectional elevation of a slab lateral conveyor taken through the inboard end thereof; and FIG. 9 is an enlarged cross-sectional elevation taken along line IX—IX of FIG. 5.

FIGS. 1, 2 and 3 show generally a sawmill 10 which includes a log carriage 11 and a headrig 12. The carriage has a log platform 13 which is supported on a plurality of rotatable wheels 14 secured to a pair of spaced-apart axles 15 journalled to the underside of the platform.

A pair of log holding and turning mechanisms 16 are secured at spaced-apart locations to the upper side of the platform. In a usual situation, each holding and turning mechanism is mounted for movement toward a longitudinal edge 17 of the platform on a guideway or rail 18 and includes a pivoted holding arm 19 adapted to hold the log relative to the table. Each mechanism 16 may, as shown, include a pair of dogs 20 which also secure the log during the sawing operation.

Wheels 14 of carriage 11 are engaged with a pair of parallel spaced-apart rails 21 secured to a foundation 22 of the sawmill for reciprocal movement of the carriage along a straight line relative to headrig 12. The wheels removed from the saw have a circumferential V-shaped recess engaged with an inverted V-profile on rails 21, as shown in FIG. 3; plain cylindrical rollers are used adjacent the saw as ilustrated in FIG. 4. The mechanism by which the carriage is reciprocally driven along rails 21 is standard in the lumbering industry and therefore is not illustrated as a part of this invention.

As stated above, the present invention encompasses sawmill installations wherein the headrig is stationary or movable; in either case the saw may be a bandsaw or a circular saw. For the purposes of illustration, however, headrig 12 is shown as comprising a bandsaw 25 which forms a closed loop around a pair of driving wheels, an upper wheel 26 being shown in FIG. 3. As illustrated in FIGS. 1, 2 and 3, the headrig is fixed and carriage 11 is disposed relative to the headrig so that longitudinal edge 17 of the platform is disposed closely adjacent the vertical cutting portion of bandsaw 25 and moves reciprocally past the bandsaw.

A log 28 is secured to the carriage for severing of a cant or slab 29 from the log as the log moves reciprocally from a first position (at the left of the band saw in FIG. 1) to a second position (at the right of the bandsaw in FIG. 1). As the carriage moves from the first to the second position, the bandsaw engages a portion of the log extending beyond edge 17 of the carriage to sever the cant from the log. The log acquires a planar slab face 30 disposed toward the saw and the cant acquires a planar sawed face 31 disposed toward the bandsaw. As the carriage moves from its first to its second position, the amount of solid uncut wood between the cant and the log becomes progressively smaller and the cantilever load of the cant of this solid uncut wood cant root becomes progressively greater. As the cut between the log and cant nears completion, the cantilevered load of the cant upon the root becomes so great that the cant may break away from the log before the cut is complete. Such breaking away of the cant from the log is known in the lumbering industry as "break-out" and has long been a source of losses to sawmill proprietors as it reduces accurate lumber manufacture.

A chip and knot conveyor 32, illustrated in FIG. 1 as a closed-loop, chain-driven, slat-type conveyor, is mounted adjacent the bandsaw and collects sawdust, bark chips and knots which are produced during the cutting process to pass this matter through an opening 33 in sawmill floor 34 to a collector (not shown). These scraps are processed into paper insulation board and other by-products of sawmill operation.

The sawmill includes a slab conveying means for moving the slab away from the headrig to areas of the sawmill where subsequent operation such as ripping, planing and trimming processes are performed upon the slab or cant. Longitudinal slab conveying means 35 are provided adjacent carriage 11 below the carriage platform. The longitudinal conveying means shown takes the form of a plurality of rollers 36 which have their upper extents disposed in a common horizontal plane. Each roller is rotatably mounted between a pair of upstanding pedestals 37 extending from the sawmill floor. For the purposes of description, the rollers are shown as driven by a belt and pulley system 38 powered by an electrical motor 39. Slab conveying means 35 is designated as a longitudinal slab conveying means to distinguish it from lateral slab conveying means 50 which constitutes another portion of the present invention.

A plurality of elongated cylindrical rollers 40 engage the slab at selected spaced-apart locations longitudinally of the slab on the side of the slab opposite from log 28. Each roller has an axis of rotation 41 disposed substantially vertically with respect to the plane in which the log reciprocates. In a preferred form of the invention each roller is an elongated air-filled bag, although a body of foam rubber having an abrasion resistant deformable covering may be used. The elongate cylindrical peripheral surface of each roller is locally deformable to conform to the exterior contour of the slab with which the roller is engaged. Each roller is secured to the lower end of a depending pivoted axle 42 and is mounted so as to engage slab 29 with a primary or principal vector component of force which acts on the slab in a direction substantially normal to the plane of log slab face 30. As illustrated, axle 42 has an upper end 43 which is disposed inwardly toward the plane of bandsaw 25 from the position which roller 40 occupies when engaged with a slab. The upper end of the axle is pivoted to a pair of depending lugs 44 on a stationary overhead beam or foundation 45. Because the pivotal connection between axle 42 and lug 44 is closer to log slab face 30 than the center of gravity of roller 40 when the roller is engaged with a slab, the roller is gravitationally biased into engagement with the slab to provide the primary vector component of force normal to the log slab face.

As the log moves from its first uncut position to the second position, the slab successively engages the rollers. The rollers are rotatably mounted on their axles so that resistance to movement of the slab relative to the rollers is minimized. The locally deformable surfaces of the rollers, however, are deformed so as to conform to the contour of the slab so that friction between the rollers and the slab acts to prevent downward movement of the slab relative to the log as the slab is severed from the log. Additionally, since the rollers have a primary component of force on the slab which is substantially perpendicular to log slab face 30, the slab is forced into engagement with the log and frictional forces generated between the log slab face and the slab sawed face further act to prevent downward movement of the slab. The slab thus is restrained from moving downwardly relative to the log until the slab is completely severed from the log. Breakout is retarded since the cantilever load on the wood root between the log and slab is taken up or absorbed in rollers 40 and in the friction between the log and slab.

In many instances it has been found desirable to provide a pneumatic or hydraulic bias between axles 42 and foundation 45 to increase the magnitude of the primary normal component of force on log slab face 30. Accordingly, the present invention includes pivotally mounting an extensible ram 46 between foundation 45 and a location on each axle 42 which is between pivot lug 44 and the roller. It is within the scope of this invention, however, that different geometries of the axle support and the biasing mechanism may be used as local conditions or requirements dictate.

In an experimental and developmental installation of the present invention, each of the rollers 40 was replaced by a plurality of automobile tires mounted on a common axle for rotation substantially in horizontal planes. Such a modified form of rollers has been found to function well to reduce, and in many cases completely prevent, break-out between the slab and log. The use of a single elongated cylindrical deformable roller in place of a plurality of automobile tires is preferred, however, since such slab engaging means inherently accommodates any slab contour, whether it be cant slab as illustrated or a rectangular slab.

Slab conveying means are disposed below the log adjacent the log slab face. The longitudinal slab conveying means have been described above; lateral slab conveying means 49 are also included in the present invention. The lateral slab conveying means in a preferred embodiment of the invention are provided in the form of a plurality of chain conveyor means 50 which are mounted at spaced-apart fixed locations along a path of movement of log carriage 11 opposite the second position of the carriage.

As illustrated in FIG. 3, each chain conveyor means 50 has an elongated chain support housing 51 which rotatably mounts an idler sprocket 52 at an inboard end 53 adjacent the log carriage, and a rotatably driven chain drive sprocket 54 at an outer or outboard end 55 removed from the log carriage. Preferably housing 51 is disposed perpendicular to the direction of rectilinear movement of the log carriage. A continuous length of link chain 56 is engaged with the projecting teeth of the idler and drive sprockets and has its upper portion between the sprockets projecting above the exterior of the housing for engaging a slab which has been severed from the log and is displaced downwardly from adjacent the log to engage the chain (see FIG. 4). The drive sprockets are driven from a common drive shaft 57 which is rotatably journalled in the upper ends of a plurality of spaced pedestals 58. The shaft is driven from a motor, such as electric motor 59 shown in FIG. 1, by gear means 60. It is within the scope of this invention, however, that chains or V-belt drive means may be used or that shaft 57 may be connected directly to motor 59. Each drive sprocket 54 is keyed to shaft 57 for rotation therewith. The shaft is further journalled by bearings 60 to the outboard ends of housings 51 to support the outboard ends of the housings for pivotal movement about a fixed pivot axis. Shaft 57 is disposed in a vertical plane so that the chains at the upper extents of the drive sprockets are disposed just above the upper extents of rollers 36 of longitudinal slab conveying means 35.

Inboard end 53 of each chain housing is mounted for vertical movement about drive shaft 57. As illustrated in FIG. 3, a connecting rod 61 is pivotally connected between a pair of depending lugs 62 extending from the underside of the chain housing adjacent the log carriage. The opposite end of the connecting rod is pivotally connected to the end of one arm of a bellcrank 63 which has a second arm connected to an extensible ram 64. The bellcrank and the ram are mounted to the floor of the sawmill and the extensible ram is pneumatically or hydraulically operated; mechanical means such as a jackscrew may also be used in lieu of a fluid operated ram. It is also within the scope of this invention that the inboard end of chain housing 51 may be connected to a vertically oriented extensible ram or the like for movement of the chain conveyor about shaft 57.

Each chain conveyor 50 has two positions; in its first position the inboard end of the lateral conveyor is disposed below the upper extent of the rollers of longitudinal slab conveyor means 35, while in its second position the inboard end of the lateral conveyor housing is elevated so that the upper course of chain 56 is horizontal and is disposed above the plane defined by the upper extents of rollers 36. The chain drive shaft is rotated so that the upper course of each chain moves from the inboard to the outboard end of its respective housing 51.

An elongated vertical plate 68 extends from floor 34 of the sawmill parallel to the plane of saw 25 between the longitudinal edge 17 of the carriage and the plane of headrig saw 25. The plate has its upper edge disposed in a straight line along longitudinal edge 17 of carriage 11 and below the upper surface of platform 13. An elongated hinge member or slab deflector 69 is pivotally connected by means of a piano-type hinge 71 along its elongate extent to the upper edge of the plate. The deflector extends through the plane of headrig saw 25 to above the lateral and longitudinal slab conveying means. The deflector preferably has a planar upper surface and has a rectangular configuration with the elongate extent of the deflector being disposed parallel to the direction of rectilinear movement of the carriage. In a preferred form of the invention the deflector has an elongate extent substantially equal to the length of the longest log which may be sawed by headrig 12. The forward or headrig end 70 of deflector or hinge member 69 is disposed a predetermined distance behind bandsaw 25, although it is within the scope of the present invention that the hinge member may extend forwardly to be just adjacent fixed deflector plate 81.

As shown in FIGS. 5 and 9, hinge 71 is composed of a plurality of longitudinally bored, coaxially aligned sleeves 71 and 71' which alternate one which another along the length of plate 68. Sleeves 71 are secured to the underside of deflector 69 adjacent the log carriage, while sleeves 71' are secured to the upper edge of the plate. An elongated hinge pin 72 (FIG. 9) is engaged within all of the sleeves so that the deflector is hingeable relative to the plate. Hinge member actuating means 73, which in a preferred form of the invention comprise extensible rams, are mounted between the underside of the hinge member and the plate at spaced-apart locations along the plate. The end of each ram remote from the hinge member is pinned to a support bracket or clip 74 extending laterally from the plate. The rams may be hydraulically or pneumatically operated or, as mentioned previously in conjunction with ram 64, may be replaced by mechanical means such as a jackscrew. Each actuating means 73 may be cross-connected for parallel operation with the other actuating means by means not shown but considered to be within the talents of one skilled in the art.

Hinge member 69 has two positions relative to its supporting plate 68. In the first position (illustrated in FIG. 3) the hinge member extends laterally from carriage 11 and has its upper surface disposed parallel to the upper surface of carriage platform 13 and serves as a cant support means. In its first position, the hinge member is disposed very closely adjacent the bottom of cant 29. Preferably, the distance between the cant and the hinged member is one inch or less. A cant being sawed from a log from 16' to 40' long can deflect this amount to engage the hinged member without suffering breakout. In its second position (illustrated in FIG. 4) the hinge member is disposed so that its upper surface is inclined downwardly and outwardly from the log carriage toward the upper extents of the lateral and longitudinal slab conveying means and serves as a slab guide and deflector. Since the cant is supported relative to the log by the hinge member the cantilever load which normally leads to breakout is prevented from reaching a magnitude sufficient to sever the solid wood root existing between the log and the cant.

In operation of the present invention, the hinge member and the lateral slab conveyor means are disposed in their first positions, as illustrated in FIG. 3, as the carriage, having log 28 secured thereto, begins to move from its first to its second position past bandsaw 25. As the log traverses the position of the bandsaw, the portion of the log projecting beyond the plane of bandsaw 25 from the carriage is cut to define cant 29. As the motion of the carriage past the bandsaw proceeds, the cant is successively engaged with the plurality of rollers 40 which are biased against the cant to maintain frictional engagement between the cant and the log. This frictional engagement, in conjunction with the support of cant 29 provided by hinge member 69, maintains the cant in position relative to the log until the cut is complete. Once the cut is complete, the log carriage pauses momentarily in its rectilinear motion past the headrig while lateral slab conveyor means 50 are moved from their first to second positions (shown in FIG. 4) and while the hinge plate 69 is moved from its first to second position. Preferably the movement of the lateral slab conveyor means and the hinge member are simultaneous in that the chain housings 51 are pivoted about shaft 57 while hinge member 69 is moved by operation of rams 73. The rams 64 and 73 are connected in parallel to a source of operating fluid. It is within the scope of this invention, however, that these movements may take place successively or in reverse order. As the hinge member 69 moves into its second position, the vertical support of the cant is removed so that the cant slides downwardly along slab face 30 of the log and outwardly along the hinge member to engage the chains 56 of lateral slab conveyors 50. The cant is further guided in such sliding movement by the lower ends of roller 40 which also function as guide means for the slab or cant. The cooperation between the rollers and the hinge member assures that the cant will come to rest on the lateral slab conveying means with its sawed face 31 disposed downwardly of the conveyors. After the cant has been engaged with the conveyors in its predetermined manner, lateral conveying means 50 are moved into their first position so that the cant is transferred to the continuously rotating rollers of longitudinal slab conveying means 35. Once the cant has been freed from the slab face of log 28, carriage 11 is caused to return to its first position where the log holding and turning means 16 are moved on rails 18 toward longitudinal edge 17 of the carriage so that a new portion of the log projects beyond the plane of bandsaw 25. The log is then in condition for a second pass through the headrig. As the carriage is returned to its first position, the hinge member is returned to its first position in order to receive another slab severed from the log.

The magnitude of the primary vector component of force normal to log slab face 30 may be reduced after hinge member 69 is moved to its second position by removing the bias imposed on rollers 40 by rams 46. Alternatively, if rollers 40 are biased by gravity, the magnitude by primary vector component of force may be such that the frictional engagement between the log and the slab does not prevent downward movement of the slab when the hinge member is indexed out of engagement with the underside of the slab.

FIGS. 5 and 6 illustrate a slab deflector means 80 which is fixedly disposed adjacent the bandsaw opposite the bandsaw from log carriage 11. Deflector means 80 includes a fixed deflector plate 81 which has a rectangular configuration defined by transverse ends 82 and 83 which are spaced apart a predetermined distance and bracket the forward and rear edges of bandsaw 25 (see in FIG. 5). The plate also has upper and lower longitudinal edges 84 and 85 which are parallel to one another. The upper edge 84 is disposed parallel to and closely adjacent to bandsaw 25 (see FIG. 6); lower edge 85 is disposed below the upper edge and preferably is in line with the outboard edge of hinge member 69 when hinge member 69 is disposed in its second position. The lower edge of deflector plate 81 is disposed adjacent scrap conveyor 32 which lies below the plane defined by the upper extents of rollers 36 of the longitudinal slab conveyor means. The orientation of the scrap conveyor relative to the longitudinal slab conveying means is preferred in order that the cant not engage the scrap conveyor as the cant is moved into engagement with the slab conveying means.

The deflector plate is secured by a plurality of nut and bolt combinations 86 to a fixed foundation 87. Foundation 87 includes an angled member 88 to which deflector plate 81 is directly engaged and a primarily vertical member 96 adjacent saw 25. Member 96 is spaced farther from the saw at its lower end than at its upper end in order to accumulate sawdust and the like. The bolts cooperate with slots 89 in the member 88 in order that the deflector plate may be adjusted relative to the plane of bandsaw 25. Deflector plate foundation 87 also includes means for adjustably supporting a guide block 90 for the bandsaw. The guide block preferably is a block of lignum vitae or some similar material having bearing properties, and is disposed in cooperation with a second block 91 disposed on the carriage side of bandsaw 25.

Blocks 90 and 91 define a gap therebetween through which the bandsaw 25 passes. The foundation 87 preferably is disposed forwardly of opening 33 through which scraps fall from conveyor 32 and also preferably is disposed apart from forward end 70 of the hinge plate. A fixed foundation part 92 is disposed between foundation 87 and the forward end of the deflector plate and need not be coplanar with deflector 81.

Deflector means 80 is provided in order that the forward end of a cant moving from adjacent the log to engagement with the slab conveying means does not foul the bandsaw during such movement. Without the provision of the deflector means, it has been found that the forward end of a cant often will ride against the bandsaw, which normally is continuously moving, and will jam the bandsaw so as to damage the saw teeth or foul the guide blocks. Also, undue lateral pressure on the bandsaw has adverse effects upon the guide means. Deflector plate 81 also assures that the cant is guided along its entire elongate extent as it moves from adjacent the log unto the lateral slab conveyors.

A pneumatic hose or conduit 94 is connected to a compressed air jet nozzle 95 from a source of compressed air in the saw mill (not shown). The nozzle is shown in FIG. 6 to be of the vertical slot type and is disposed adjacent one end of the deflector plate within foundation 87. Compressed air, periodically supplied to the conduit, is jetted into the open space in foundation 87 between member 96 and saw 25 to clear the space of sawdust, scrap, bark chips and the like which would otherwise accumulate in the foundation. Without such means for clearing the foundation of wood scraps, spontaneous combustion may be caused as the bandsaw continuously moves past wood chips accumulated in the foundation, or other damage caused.

The invention described above provides novel means which, in combination with structure provided in a sawmill, results in the elimination of breakout and assures that a slab or cant sawed from a log will be disposed on conveying means in a predetermined manner. The apparatus of this invention does not increase the space required for conventional sawmill headrig and carriage installation and eliminates the need for manual off-bearers.

The lateral slab conveying means assures that the slab will be removed rapidly and surely from the carriage. The rollers, comprising the slab engaging means are especially useful when the slab is a partially round cant having a geometry which induces tipping of the cant away from the log as soon as the cut is complete.

While the invention has been described above in conjunction with specific apparatus, this has been by way of example only and should not be considered as strictly limiting the scope of the present invention.

What is claimed is:

1. An off-bear and slab-handling apparatus for a slab cut by a headrig from a log secured to a carriage movable reciprocably relative to the headrig, the apparatus comprising
   (1) slab engaging means disposed opposite the slab face of the log adjacent the location the log occupies as the slab is cut from the log
      (a) for frictionally engaging the slab and
      (b) for exerting a primary vector component of force on the slab substantially normal to the log slab face to maintain the slab in position relative to the log,
   (2) first slab conveying means below the slab engaging means for moving the cut slab laterally from the log,
   (3) second slab conveying means below the slab engaging means for moving the cut slab in a direction parallel to the log slab face,
   (4) slab deflecting means movably mounted along said location of the log below the log slab face, and
   (5) selectively operable means (a) for moving the slab deflecting means between
   (i) a first position in which the deflecting extends horizontally under the slab and
   (ii) a second position in which the deflecting means extends downwardly of the log toward the first slab conveying means and
(b) for moving the first slab conveying means to transfer a slab from the first to the second slab conveying means.

2. Apparatus according to claim 1 wherein the headrig comprises a bandsaw having a forward edge and a rearward edge and the slab deflecting means comprises an elongated hinge plate disposed behind the rearward edge of the saw, and including a fixed deflector plate disposed opposite the bandsaw from the log,
   (1) the deflector plate having
      (a) a forward edge disposed forwardly of the forward edge of the bandsaw,
      (b) a rear edge disposed rearwardly of the rearward edge of the bandsaw,
      (c) an upper edge disposed parallel to and closely adjacent the bandsaw, and
      (d) a lower edge disposed parallel to but removed from the bandsaw,
   (2) the hinge plate having its elongate extent aligned with the plane of the bandsaw adjacent the log and having an elongate edge adjacent the log, and
   (3) stationary support means hingeably mounting the hinge plate along its elongated edge
   (4) the hinge plate being movable between the first and second positions and being substantially coplanar with the deflector plate in its second position, the deflector plate and the hinge plate cooperating to guide a slab from the log to the first slab conveying means when the hinge plate is disposed in its second position.

3. An off-bear and slab-handling apparatus for a slab cut by a headrig from a log secured to a carriage movably reciprocably relative to the headrig, the apparatus comprising
   (1) a plurality of vertically disposed elongate locally deformable rollers suspended opposite the slab face of the log adjacent the location the log occupies as the slab is cut from the log
      (a) for frictionally engaging the slab as the slab is cut and
      (b) for exerting a primary vector component of force on the slab substantially normal to the log slab face to maintain the slab in position relative to the log,
   (2) a substantially vertically oriented axle for each roller,
   (3) axle hinge means for movably mounting each axle to a fixed support at a location above the respective roller for movement of the roller in a plane normal to the log slab face,
   (4) means for biasing each roller into contact with the slab,
   (5) first slab conveying means below the slab engaging means and below the log location for moving the cut slab laterally from the log,
   (6) second slab conveying means below the slab engaging means and below the log location for moving the cut slab in a direction parallel to the log slab face,
   (7) slab deflecting means movably mounted along said log location below the log slab face, and
   (8) selectively operable means
      (a) for moving the slab deflecting means between
         (i) a first position in which the deflecting means extends horizontally under the slab and
         (ii) a second position in which the deflecting means extends downwardly of the log toward the first slab conveying means and
      (b) for moving the first slab conveying means to transfer a slab from the first to the second slab conveying means.

4. An off-bear apparatus for handling a slab during and after cutting thereof by a saw from a log mounted to a platform, the log having a planar slab face, the apparatus comprising slab conveying means disposed adjacent the platform below the log slab face, a first slab guiding plate disposed adjacent the platform superadjacent the slab conveying means and extending lengthwise of the log for guiding the slab into engagement with the slab conveying means, means for hingeably mounting the first slab guiding plate for movement about a hinge axis disposed lengthwise of the log and adjacent the platform, a second slab guiding plate fixedly disposed in juxtaposition to the saw adjacent the side of the saw opposite from the log and adjacent the first slab guiding plate for guiding the slab into engagement with the slab conveying means in cooperation with the first slab guiding plate, and means for moving the slab conveying means.

5. An off-bear apparatus according to claim 4 wherein the first guiding plate has a first position wherein the first guiding plate extends laterally relative to the platform to support the slab and has a second position wherein the first guiding plate extends downwardly from the platform toward the conveying means and is aligned with the second guiding plate, and the plate for moving the first slab guiding means is selectively operable to move the first guiding plate between the first and second positions.

6. An off-bear assembly for handling a slab during and after severance thereof from a log secured to a carriage for reciprocatory relative motion between the log and a saw moving in a vertical plane oriented parallel to the elongate extent of the log, the log having a planar slab face and the slab having a planar sawed face as a result of engagement of the saw with the log, the assembly comprising an essentially cylindrical roller disposed adjacent the log on the side of said plane opposite from the log, means for mounting the roller for rotation about an essentially vertical axis fixed from movement in a direction parallel to the direction of relative movement between the log and the saw, means for biasing the roller into forcible engagement with the slab so that the roller engages the slab with a force acting essentially normal to the slab sawed face and the slab sawed face in response to said forcible engagement by the roller is forcibly engaged with the log slab face for urging the slab to maintain its initial position relative to the log by frictional engagement between said faces until severance of the slab from the log is complete, slab conveying means disposed below the log adjacent the slab face thereof for moving a slab cut from the log away from the position the log occupies when the severance is complete, and means for further supporting the slab as it is being severed from the log and for guiding the severed slab into engagement with the slab conveying means with its sawed face downward comprising an elongate plate disposed adjacent to and below said position and hingeably mounted along one edge thereof for movement about a hinged axis adjacent to and parallel to the plane between a first position in which the plate extends horizontally under the slab and supports the same and a second position in which the plate extends downwardly from said edge toward the slab conveying means for guiding the slab to the conveying means.

7. An off-bear assembly according to claim 6 wherein the slab conveying means includes controllable means for moving the lower edge of the slab laterally away from the log as the slab moves to the conveying means from the plate disposed in its second position.

8. An off-bear assembly for handling a slab during and after cutting thereof from a log supported on a carriage, the log having a planar slab face and the slab having a planar sawed face, the assembly comprising slab engaging means for engaging the slab during cutting of the slab to maintain the slab substantially in position relative to the log, slab conveying means disposed below the log adjacent the slab face thereof, the slab conveying means comprising a chain conveyor disposed normally of the log slab face below the log, and a plurality of transfer rollers having substantially horizontal axes of rotation disposed normally of the log slab face, the chain conveyor being disposed between the rollers, the rollers having their upper extents substantially in a common horizontal plane, the chain conveyor having an inboard end adjacent the log and an outboard end disposed above the horizontal plane, a slab deflector hingeably mounted adjacent the carriage below the log slab face for movement about a hinge axis extending parallel to the length of the log, and having a first position in which the slab deflector extends substantially horizontally under the slab for additionally supporting the slab during cutting and a second position in which the slab deflector extends downwardly toward the chain conveyor, selectively operable means for moving the inboard end of the conveyor between a first position below the horizontal plane and a second position above the horizontal plane for transferring a slab from the chain conveyor to the rollers, and means operatively associated with the selectively operable means for moving the slab deflector between its first and second positions.

References Cited by the Examiner

UNITED STATES PATENTS

| | | | |
|---|---|---|---|
| 752,440 | 2/04 | Davies | 143—157 |
| 1,177,705 | 4/16 | Johnson | 143—157 |
| 2,480,536 | 8/49 | Andrus | 143—157 |
| 2,527,024 | 10/50 | Mitchell | 143—157 |
| 2,588,484 | 3/52 | Charters et al. | 143—157 |

LESTER M. SWINGLE, *Primary Examiner.*

WILLIAM W. DYER, JR., *Examiner.*